United States Patent [19]
Myers et al.

[11] Patent Number: 5,050,066
[45] Date of Patent: Sep. 17, 1991

[54] APPARATUS WITH A SINGLE MEMORY AND A PLURALITY OF QUEUE COUNTERS FOR QUEUING REQUESTS AND REPLIES ON A PIPELINED PACKET BUS

[75] Inventors: Mark S. Myers, Portland; Eileen Riggs, Hillsboro, both of Oreg.

[73] Assignee: Intel Corporation, Santa Clara, Calif.

[21] Appl. No.: 257,857

[22] Filed: Oct. 14, 1988

[51] Int. Cl.$^5$ .................. G06F 13/14; G06F 13/42
[52] U.S. Cl. .................. 364/200; 364/244.3; 364/246.2; 364/238.6; 364/240.8
[58] Field of Search ... 364/200 MS File, 900 MS File

[56] References Cited

U.S. PATENT DOCUMENTS 4,480,307  10/1984  Budde et al. .................. 364/200
4,615,001  9/1986  Hudgins, Jr. .................. 364/200

Primary Examiner—Thomas C. Lee
Attorney, Agent, or Firm—Owen L. Lamb

[57] ABSTRACT

Apparatus for queuing requests and replies on a pipelined packet bus. A RAM (212) buffers bus requests by storing packet information corresponding to each request to be sent over said bus in bus time slots allotted to each request. Three send slots (208) keep track of the state of three send requests that are stored in the RAM (212). Three receive slots (210) keep track of the state of three receive requests that are stored in the RAM (212). Nine send queue counters (230) are stepped through a series of states to track an outgoing request and to track a corresponding incoming reply. Six receive queue counters (232) are stepped through a series of states to track an incoming request and to track a corresponding reply. An output MUX (214) connected to the send and receive queues generates status information as to the state of the slots. The status information as to the state of the send and receive slots is used to control the incrementing or decrementing of the send queue counters (230) and the receive queue counters (232) in accordance with a predetermined system bus protocol.

14 Claims, 4 Drawing Sheets

5,050,066

APPARATUS WITH A SINGLE MEMORY AND A PLURALITY OF QUEUE COUNTERS FOR QUEUING REQUESTS AND REPLIES ON A PIPELINED PACKET BUS

CROSS REFERENCE TO RELATED APPLICATION

U.S. patent application Ser. No. 07/261,047 "Bus For a Data Processing System", by G. Bier, et al filed on Oct. 21, 1988, now U.S. Pat. No. 5,006,982, and assigned to Intel Corp. and Siemens AK.

U.S. Pat. No. 4,853,846, of D. Johnson, et al filed July 29, 1986, and assigned to Intel Corp.

BACKGROUND OF THE INVENTION

1. Field of the Invention

This invention relates to multiprocessing systems, and more particularly, to an apparatus for queuing requests for access to and replies received on a pipelined packet bus interconnecting a plurality of modules.

2. Description of Related Art

A multiprocessing system is described in U.S. Pat. Nos. 4,315,308, 4,480,307 and 4,473,880, which are assigned to Intel Corporation. In this system, several modules share a common bus for signalling between modules. The modules may be data processors, memories, or input/output devices and their respective controllers. Several requests for use of the bus must be held until the bus is available to take the request. Replies received over the bus must likewise be buffered, reordered when necessary, and sent to the appropriate requesting module, or retried to correct an error condition. Information is transferred over the bus in the form of information packets during allocated bus transmission time slots. The bus control is in the form of a number of first-in first-out (FIFO) queues that hold these packets. For example, a grant queue is a FIFO buffer that holds request packets that are waiting to be granted use of the bus.

The bus control becomes complex when provisions are made for error detection and recovery and when many intertwined FIFOs are defined to move data to and from the internal logic of the modules using the bus. As many as fourteen different FIFO queues that hold data are necessary to fully describe a complete functioning packet bus that will track three separate bus requests at a time. A bus protocol establishes and maintains a pipeline for requests and replies, monitors the pipeline for error conditions, and inserts replies in the pipeline during the appropriate time slot position corresponding to a recognized request.

Since die area is at a premium in very large scale integrated (VSLI) circuit technology in order to implement such a complex bus control it is necessary to provide a circuit that is limited in size but still operates at the fastest speed of which the circuits are capable.

It is therefore an object of this invention to provide an apparatus for queuing requests and replies on a pipelined packet bus that is limited in size but still operates at full speed.

SUMMARY OF THE INVENTION

Briefly, the above object is accomplished in accordance with the invention by providing a RAM (212) that buffers bus requests by storing packet information corresponding to each request to be sent over a bus in bus time slots allotted to each request. A number of send queue counters (230) are stepped through a series of states to track an outgoing request and to track a corresponding incoming reply. Receive queue counters (232) are stepped through a series of states to track an incoming request and to track a corresponding reply. Send slots (208) keep track of the state of send requests that are stored in the RAM (212) and receive slots (210) keep track of the state of receive requests that are stored in the RAM (212). An output MUX (214) connected to the send and receive slots generates status information as to the state of requests originating in the component in which the queues output MUX is located. The status information as to the state of send and receive slots is used to control the incrementing or decrementing of the send queue counters (230) and the receive queue counters (232) in accordance with a predetermined system bus protocol.

The invention has the advantage that a packet bus complex sequencing protocol with fault tolerance is implemented in such a way as to fit on a minimum VSLI die area.

BRIEF DESCRIPTION OF THE DRAWINGS

The foregoing and other objects, features, and advantages of the invention will be apparent from the following detailed description of a preferred embodiment of the invention as illustrated in the accompanying drawings wherein.

DESCRIPTION OF THE PREFERRED EMBODIMENTS

Figure 1:
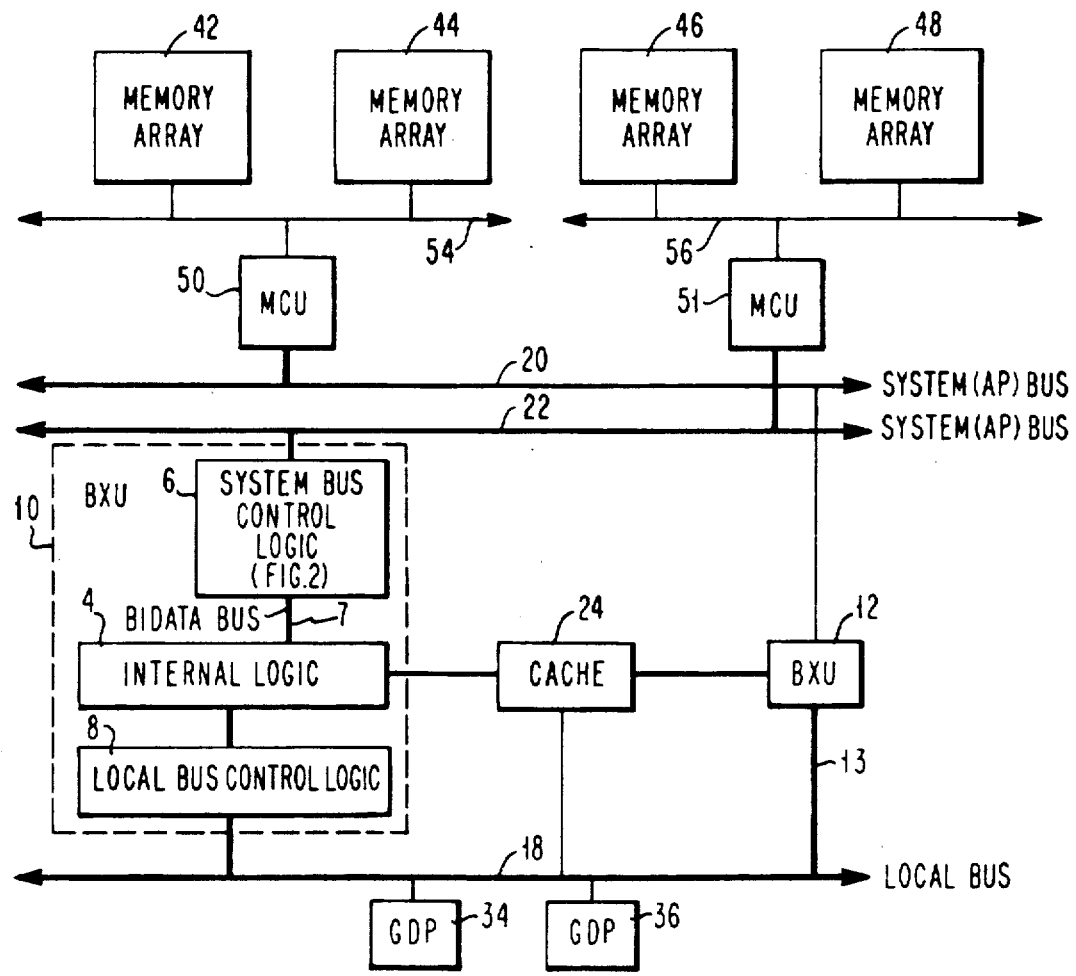
FIG. 1 is a block diagram of a dual-bus data processing system in which the present invention is embodied.

Refer now to FIG. 1 which is a block diagram of a dual system-bus multiprocessing system. Bus expander units (10, 12) are attached to dual-system busses (20, 22) and to a local bus (18). The local bus provides the interface to generalized data processors (34, 36). A second local bus (not shown) may be added to provide an interface to channel processors (not shown) which may be connected input/output devices.

The local bus (18) is controlled on the bus expander unit (BXU) side by a local bus control logic (8).

The bus expander unit (10) is attached to one of the system buses (22) through a system bus control logic (6) and to the local bus (18) through local bus control logic (8). The partner bus expander unit (12) is attached to the other system bus (20) through its own system bus control logic and to the local bus (18) through its own local bus control logic.

The system bus (20) is more fully described in the above-referenced Bier, et al application and in U.S. Pat. Nos. 4,315,308, 4,480,307 and 4,473,880, which are assigned to Intel Corporation. The system bus control logic (8) includes logic for arbitration, pipeline monitoring, address recognition, and bus signaling. The system bus control logic (6) provides buffering to hold requests and replies as they move between the bus and the internal logic (4) of the BXU. The system bus control logic (8) provides six buffers, each of which is capable of holding an entire bus packet. Three buffers are allocated for outbound requests, and three for inbound requests.

The memory control units (50, 51) provide for control of data transfers to and from memory arrays (42, 44, 46, 48) via the memory busses (54, 56).

The BXUs (10, 12) also control a common cache (24), described in the above-referenced copending Johnson et al U.S. application Ser. No. 890,859.

Figure 2:
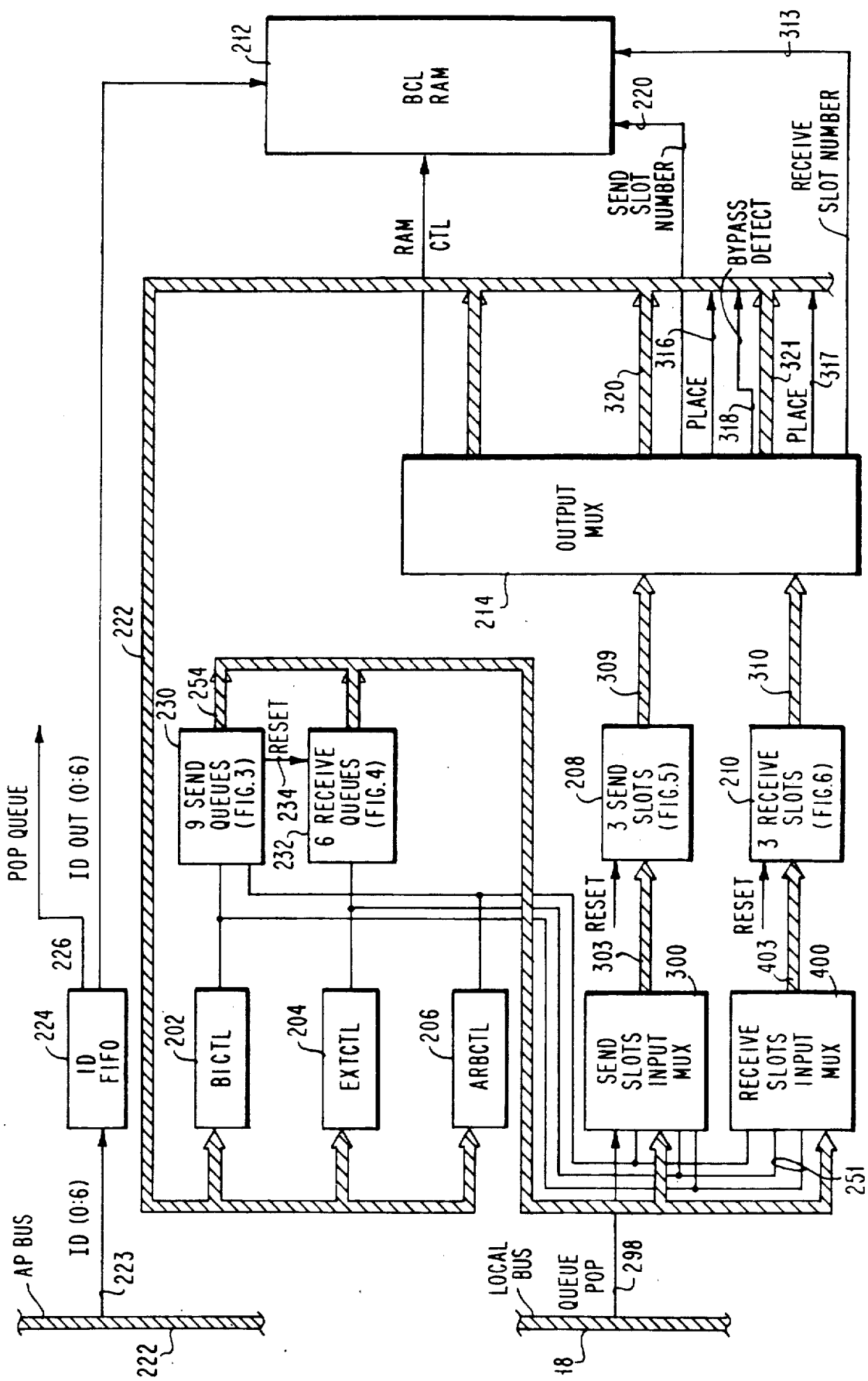
FIG. 2 is a more detailed block diagram of the System Bus Control Logic (6) shown within the BXU (10) of FIG. 1.

Refer now to FIG. 2 which shows the logic necessary to keep track of the logical state of the System Bus Control Logic (6). This logic tracks up to six transactions (requests) at once on the AP bus (22), maintaining the state information for three outgoing requests and three incoming requests. This state information (222) is used by the Bus Interface Control (BICTL) block (202), the External Control (EXTCTL) block (204), and the Arbitration Control (ARBCTL) block (206) to make decisions about what actions to take. For example, the queue state "this BXU owns the first slot in PiQ" from the output MUX (214) tells EXTCTL that the next reply on the bus belongs to this component. The state "first in GnQ" from the output MUX (214) tells EXTCTL to send a request on the next request slot on the bus. The logic of FIG. 2 keeps track of the ordering of requests, reply deferral, reissue of replies, partnering of requests between BXUs, and handles retry after an error. The logic of FIG. 2 also stores identifying (ID) bits in an ID FIFO (224). The ID bits are stored in the ID FIFO when a request is sent over the AP bus (22). The ID bits in the ID FIFO are returned to the internal logic (4) with the reply. ID bits are not sent on the AP bus, replies are matched with appropriate requests on the AP bus by ordering. The order on the bus is first-in, first-out, with the exception of reply deferral, and all components on the bus keep track of the order.

The logic of FIG. 2 is a state machine, the operation of which is described subsequently with reference to FIGS. 7 and 8. The logic of FIG. 2 is made up of counters, latches, and multiplexers, with the control coming from the EXTCTL block (204) and BICTL block (202) in the form of pushes and pops for the queues (230, 232). The logic keeps track of the depth of all the queues as well as the location in the queue of each transaction that is buffered in the BCL RAM (212).

Figure 3:
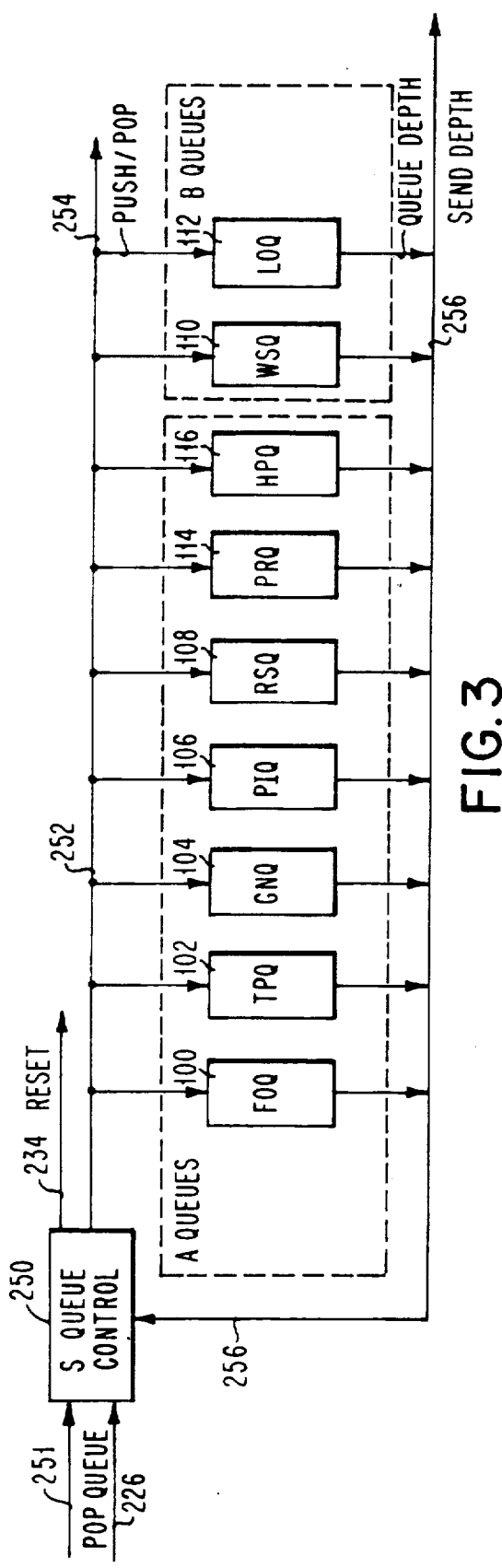
FIG. 3 is a more detailed block diagram of the send queue block (230) of FIG. 1.

As shown in FIG. 3, nine send queues are implemented as counters that keep track of the depth of the send queues. The send queues have an A side and a B side that contain two views of the same transaction. In general, A queues are the primary queues and B queues are the secondary queues which contain delayed information for use in error recovery. The inputs (252) to the queues are pushes and pops which cause the counters to increment and decrement. The send depth output (256) is information as to the queue depth (how many requests are in a queue).

Figure 4:
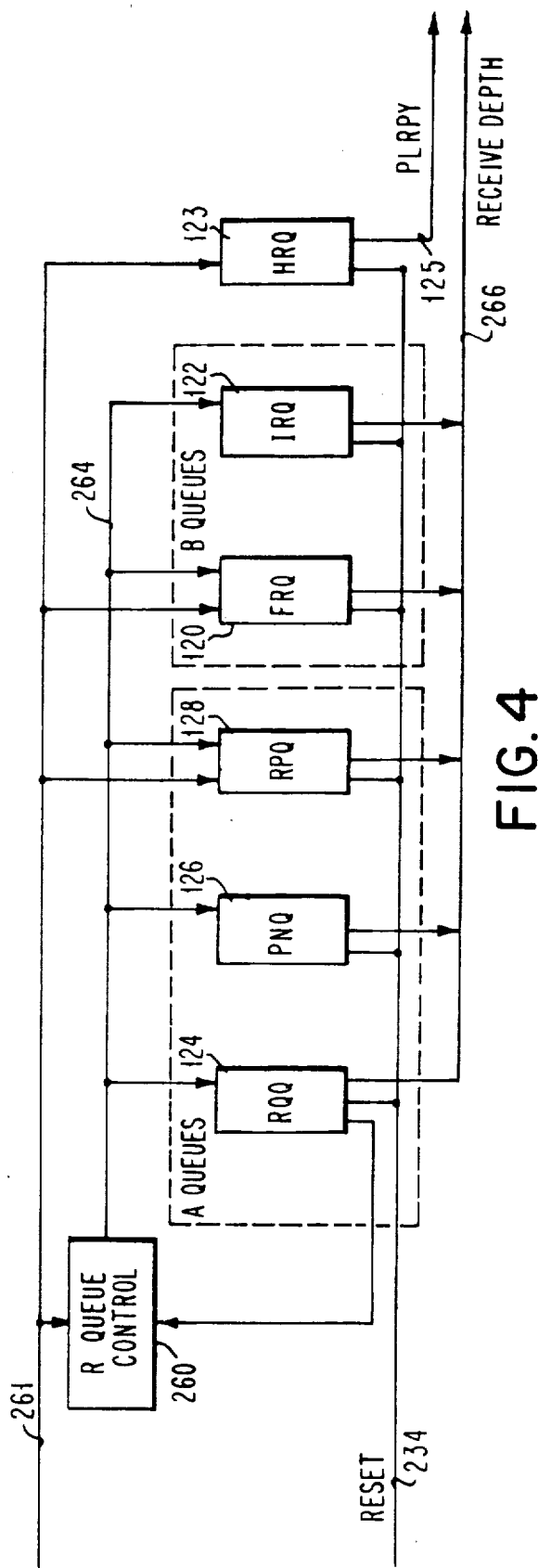
FIG. 4 is a more detailed block diagram of the receive queue block (232) of FIG. 1.

As shown in FIG. 4, six receive queues are implemented as counters that keep track of the depth of the receive queues. The receive queues have an A side and a B side that contain two views of the same transaction. In general, A queues are the primary queues and B queues are the secondary queues which contain delayed information for use in error recovery. The inputs (264) to the queues are pushes and pops which cause the counters to increment and decrement. The receive depth output (266) is information as to the queue depth (how many requests are in a queue).

As shown in FIG. 2, three Send Slots 0:2 (208), and three receive slots 3:5 (210), keep the state of all transactions that are buffered in the BCL RAM (212). These are transactions that are either outgoing or incoming requests. The state of a transaction consists of which queue the transaction is in and how deep in the queue the transaction is. For example, an outgoing request slot might contain the state "first in Pipe Queue (PiQ)."

The send slots (208) contain the state of outgoing requests and incoming replies, and the receive slots (210) contain the state of incoming requests and outgoing replies. Send slots interface to send queues (230) and are shown in detail in FIG. 5. Receive slots interface to receive queues (232) and are shown in detail in FIG. 6.

The output mux (214) of FIG. 2 generates the overall slot status information (222) needed by the other logic blocks. The output mux (214) generates the RAM word selects (220) for send requests by determining which send slots are available for writing into from the RAM (212) during the next packet. By comparing RAM read and write addresses, the output mux does bypass detection (318). The output mux also generates the send slot state information (320) for EXTCTL and BICTL. This state information indicates which send queue locations are occupied by this component.

The output mux (214) generates the RAM word selects (313) for receive requests by determining which receive slots are available for filling from the AP bus (222) during the next packet. The output mux determines the receive slot's status and generates the receive slot state information (321) for use by the EXTCTL and BICTL control blocks. This state information indicates which receive queue locations are occupied by this component.

The ID FIFO (224) is the logic block that holds the identification (ID) bits, ID (0:6). These same bits are returned to the internal logic (4) with the reply. The internal logic uses these bits to identify which request the reply is for. Since replies are returned to the internal logic in the same order they were issued, the ID FIFO logic is a simple FIFO. Bits are pushed onto the FIFO when a request is received and they are popped off of the FIFO when the reply is accepted by the internal logic. The ID output bits, IDOUT (1:6), are the actual FIFO bits of the bottom entry. This allows the internal logic to look ahead and determine what type of request the next reply is associated with. In addition to the FIFO, the ID FIFO block genertes the PopQue signal (226) that will be driven onto the PopQue output pin for signalling the partner BXU (12). This signal is asserted when a reply has successfully been transferred to the internal logic when the request was a write. Only writes are signaled since reads are not partnered. To determine if the request was a write, the logic examines the ID1 bit.

Send Queues

The send queues block (230) of FIG. 2 is made up of nine queue counters and an Squeue control block (250) shown in FIG. 3. The queue counters are of different sizes, depending on the requirements of the queue, but all are shift registers that shift left when pushed and shift right when popped. The control block (250) contains logic required to create the control signals (252) for the send counters and the reset signal (234) for the receive counters.

The Squeue control block (250) adds information to some push and pop signals to take into account reply deferral, PopQue signaling, and retry preparation. It also generates the signals (254) necessary to reset the BCL (6) in response to init or error conditions. A few status lines are generatated from queue depths (256) to give information to the rest of the BCL.

Receive Queues

The receive queue block (232) of FIG. 2 contains six 4-bit shifting counters and an RQueue control logic block (260) for counter control, as shown in FIG. 4. Five of the counters represent the receive queues and there is one additional counter, hold reply queue (123), that keeps track of how many replies from this component have been issued on the AP bus, but have not cleared for error conditions. The function of this counter (123) is to generate the PIRpy interface line (125) which indicates that there are no replies that are waiting for a bus error report line (BERL) signal. This counter does not interface to the slots and is not part of the state diagrams shown in FIGS. 7 and 8.

All receive queue counters have four bits since this is the maximum any receive queue needs. Inputs (261) to the counters are pushes and pops from the EXTCTL block (204) and the BICTL block (202) and a reset signal (234) generated in the send queues (230). The reset signal (234) is asserted by the init signal or the busErr signal and causes all receive queues to reset to zero except the free request queue which resets to three (the number of receive slots).

The Rqueue control block (260) creates combinational pushes and pops from the BICTL block and the EXTCTL block to recognize the case (described subsequently with reference to FIG. 8) wherein the request queue is to be bypassed. The BICTL block signals the bypass case by asserting a signal that tells the BCL (6) to transfer any incoming request directly to the internal logic (4). The Rqueue control block (260) creates the appropriate signals that cause the request queue (124) to be bypassed.

Send and Receive Slots (SSlt and RSlt)

As shown in FIG. 2, there are six slots (208, 210) in the BCL (6): three send slots Slot (0:2) and three receive slots Slot (3:5). Send slots (208) hold the state of send request transactions and receive slots (210) hold the state of receive request transactions. Send and receive slots are similar in structure, but differ in two major respects: the number of state bits and bus error handling. Send slots require more state bits to encode queue state because there are more send queues than receive queues. Send slots also handle bus error retry by reissuing all outstanding requests. Receive slots reset on bus error since these received requests will be sent again.

A slot maintains the state of a specific BCL transaction. When the BCL (6) sends a request over the AP bus (22), the request is assigned to a slot and is buffered in the BCL RAM (212). The slot number and RAM word address are the same, which allows the slot to generate the RAM address. The slot will keep the state of that transaction until it is completed. Incoming requests are buffered and assigned a slot in the same way. The state of a transaction consists of which queue the transaction is in and how deep in the queue it is.

The send and receive slots receive their control from the Bus Interface Control (BICTL) block (202), the External Control (EXTCTL) block (204), and the Arbitration Control (ARBCTL) block (206). These control blocks generate the pushes and pops of the send and receive queues and cause the slot counts to decrement or new state information to be loaded. New state information is loaded from the queues (230, 232). For example, if this BXU is first in the grant queue, and it sends a request, EXTCTL will generate the signal "popGnQ" which will cause the GnQ to decrement, the PiQ to increment, and will cause the slot state to change from GnQ to PiQ. The count value loaded into the slot is taken from the output (254) of the PiQ within the send queues block (230). If the PiQ counter stands at "3" then "3" is loaded into the slot.

The output MUX (214) generates the slot state information (320, 321) from the slot counters. An example of the state information is "I own the first slot in PiQ".

Figures 5, 6:
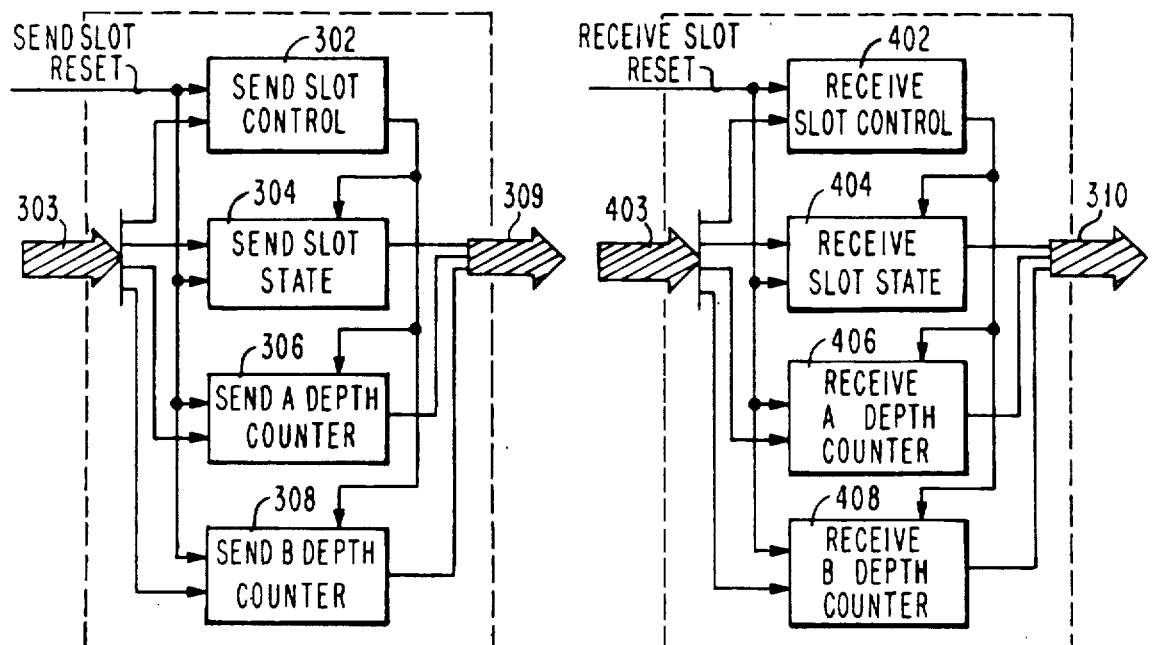
FIG. 5 is a more detailed block diagram of one of the send slots within the send slots block (208) of FIG. 2.
FIG. 6 is a more detailed block diagram of one of the receive slots within the receive slots block (210) of FIG. 2.

Refer to FIG. 5. The send and receive slot state counters (304, 404) hold the state bits that represent which queue this slot is in. The state encoding, reset values (AStDef/BStDef) and error values (AStErr/BStErr) are listed below in table I.

TABLE I

| Send Slot | | Receive Slot | |
| --- | --- | --- | --- |
| A states | B states | A states | B states |
| FoQ = 0000001 | | | FrQ = 10 |
| TpQ = 0000010 | | RqQ = 001 | IrQ = 01 |
| GnQ = 0000100 | | PnQ = 010 | |
| PiQ = 0001000 | | RpQ = 100 | |
| RsQ = 0010000 | WsQ = 01 | | |
| PrQ = 0100000 | LcQ = 10 | | |
| HpQ = 1000000 | | | |
| AStDef = 0000001 | BStDef = 00 | AStDef = 000 | BStDef = 10 |
| AStErr = 0000010 | BStErr = 00 | AStErr = 000 | BStErr = 10 |

Each state counter (304, 404) is made up of state cells which are arrayed to create the state counter. One of the state cells (cell Qst) has a load function which loads new state and two reset values. The first reset value is the init value (StDef) and the second is the error state reset (StErr). In send slots the error state is temporary queue (TpQ) and the error reset is done conditionally, depending on the state of the slot at the time of the error. Receive slots reset to the same value on init and error.

The send and receive slot depth counters (306, 308; 406, 408) track the depth of the slot in the queue. The A slot counters keep the depth in the A queues and the B slot counters keep the depth in the B queues. The slot counters decrement with each pop and load a new depth when the counter reaches zero. The new depth comes from the slots input mux (300 or 400) which selects the appropriate queue depth to be loaded.

Each slot depth counter is a four-bit shift register counter. The maximum count is determined by the maximum queue depth, since every slot can be in any queue. Each send or receive slot resets to a unique value. Table II shows the state counter reset values for each slot.

TABLE II

| send slot | reset count | receive slot | reset count |
|---|---|---|---|
| 0 | 0001 | 3 | 0001 |
| 1 | 0010 | 4 | 0010 |
| 2 | 0100 | 5 | 0100 |

The depth counters reset along with the state counter reset value, initializing the send slots to first, second, and third in free send queue (FoQ) and the receive slots to first, second, and third in the free receive queue (FrQ). To prepare for retry, each send slot conditionally resets to first, second, or third in the temporary queue (TpQ). If the slot is in a nonretry state, it will not change state on error. The receive slots reset to first, second, or third in free receive queue (FrQ) on an error.

The slot control blocks (302; 402) create all of the signals to control the slot state counters and depth counters. The control blocks create pop, load, and recirculate signals as well as the error reset signals.

Each slot input MUX (300; 400) of FIG. 2 supplies inputs to the slot state and depth counters. Each slot input mux is made up of three parts: a state mux which selects next state bits for the state counter, a depth mux which selects next state depth for the slot depth counters, and a pop mux which selects the appropriate pop signal for the slot depth counters.

The state mux sequences through the queue state transitions discussed below with reference to FIGS. 7 and 8. The state mux determines next queue state (303) from current queue state bits (222). For example, if a send slot is in the grant queue, the next queue it will go into is the pipe queue. Some states have more than one possible next state and require another signal to determine the next state. For example, from the wait send queue a slot can go into the locked queue if a locked response is received, or the free send queue if the response isn't a locked. The inputs to the state mux are the current state bits from the slot state counter plus the push/pop and internal interface lines required to make the decision between two possible next states. The outputs are the next state bits.

The depth mux selects the queue depth for the next queue state. When a slot changes from one queue to another, new state bits are loaded into the state counter (304) to represent this new queue state and the four depth lines from this queue are loaded into the slot counters (306, 308). The select lines for the mux are the current state bits.

The pop mux selects the pop signal for the slot counters (306, 308) from all queue pop signals. Using current slot state bits as select lines, the mux selects the pop for the queue this slot is in. For example, if this slot is in pipe queue, the pop mux selects PopPiQ as the appropriate slot counter pop signal.

The Output Mux (214) condenses slot status (309, 310) to meet the needs of other BCL blocks and handles special cases that would complicate the slot counters (306, 308) and the state counter (304). The output Mux (214) generates RAM word addresses (220) along with bypass detect (311), generates place lines (316) that tell which queue locations are occupied by this component's transactions, and handles reordering of replies by reordering the slots depth counter values. The output Mux is comprised of four smaller output muxes, one for each slot. Each slot's Output Mux acts independently except for common lines that are wire ORed between slots. The output mux block (214) is comprised of three logics. The Slot Number Generator generates word addresses (220, 313) for the next RAM access. The Slot Number Multiplexer time multiplexes read/write word addresses and generates the bypass detect line (318). The Slot Place generates an "occupied by this component" signal for specific queue locations.

The slot number of a transaction and the word location where it is stored in BCL RAM are the same. This correspondence allows the Output Mux to generate RAM word addresses from slot state. Six RAM word addresses are generated: send write, send read, send address, receive read, receive write, and receive address. The state along with AP and BiData bus status determines if the RAM word that corresponds to this slot will be written into or read from next cycle.

For example, if a slot is in the TpQ (102) state either waiting to arbitrate or arbitrating, and the BiData bus contains an outgoing request send write address for this slot is asserted to write the BiData bus data into the RAM (212). The other slots having done the same evaluation using their slot state will not assert send write address, creating a six-bit decoded word address. The five address lines from each slot (send slots don't generate receive read address, and receive slots don't generate send read address) are time multiplexed into three lines and the bypass detect signal (318) is generated in the output Mux (310).

Bypass detect is done at the output mux (310) by comparing read and write addresses for both the send and receive RAMs. This is done as a bit-by-bit compare at the slot and the match line is wire ORed between slots. Time multiplexing is done between read and write addresses. This multiplexing creates three address lines out of each of the six slots for a total of 18 word address bits.

The output mux (310) generates overall slot status (320) for which queue locations are occupied by one of the slots. This status is combined in line (222) and is fed into the EXTCTL and BICTL blocks (202, 204).

The general format of the Place lines (316) is PlNxxQ, for example Pl1Gnq means one of the slots is first in grant queue. Four place lines BiRpOk, BiRpP, RdRpOk, and RdRpP do not follow the general convention. They give place-type information taking into account reply deferral. The place lines are precharge discharge lines that are common to all slots of the same send/receive type.

Figures 7, 8:
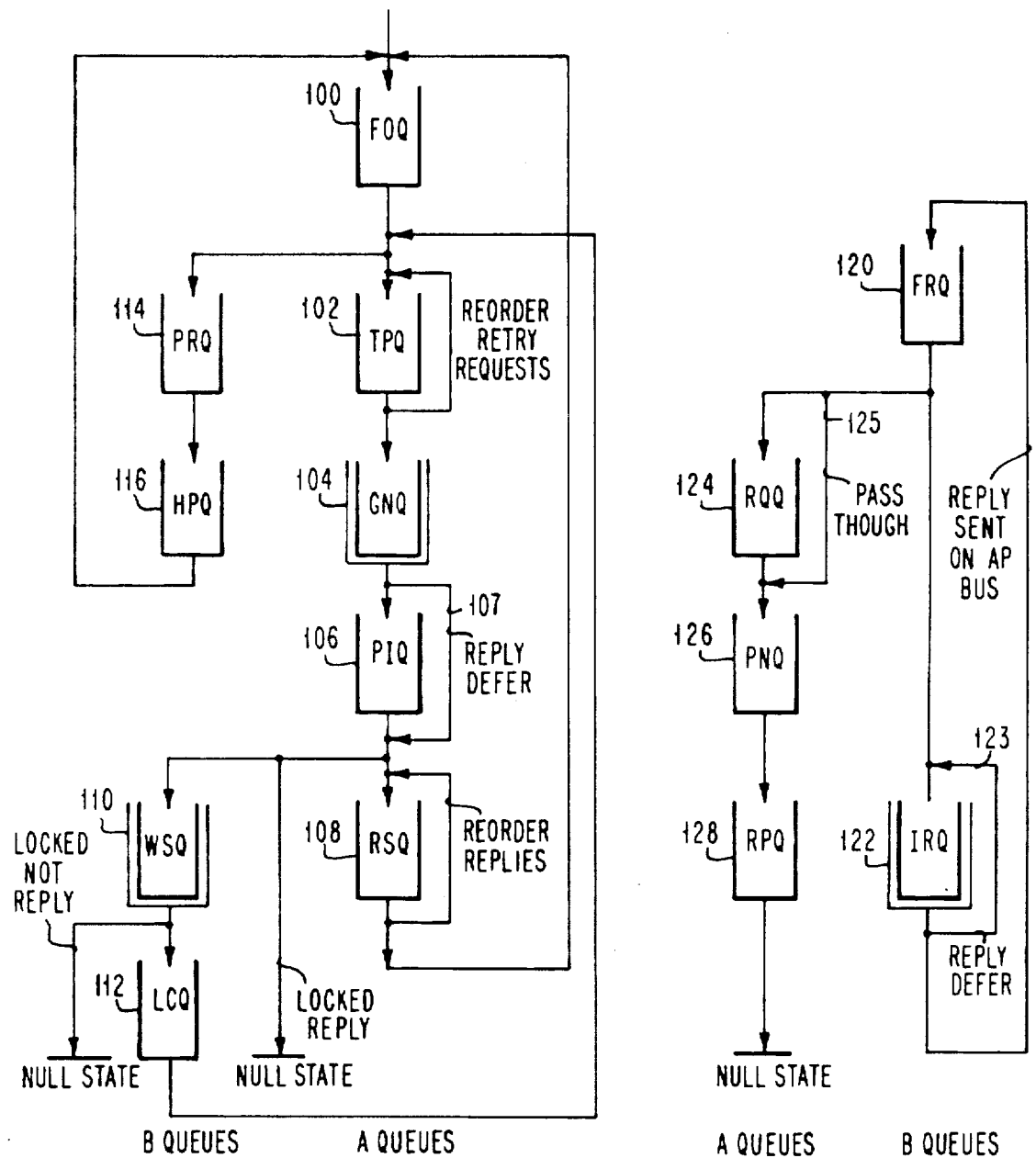
FIG. 7 is a send queue state diagram for outgoing requests.
FIG. 8 is a receive queue state diagram for incoming requests.

Refer now to FIG. 7 which is a state diagram for sending a request on the AP bus (22). Each state is correlated with a corresponding queue as defined in table I. A queue is reset to the value shown in the last column in table I in response to initialization signals (init) or error signals as designated in the next-to-the last column.

TABLE III

| Queue name | Cell name. | Queue depth | Reset condition | Reset value |
|---|---|---|---|---|
| A Send queues: | | | | |
| Free Outgoing Queue | FoQ | 3 | init | 3 |
| Temporary Queue | TpQ | 3 | error, init | 3 |
| Grant Queue | GnQ | 4 | error, init | 0 |
| Pipe Queue | PiQ | 4 | error, init | 0 |
| Response Queue | RsQ | 3 | error, init | 3 |
| Partner Queue | PrQ | 3 | error*, init | 0 |
| Hold Partner Queue | HpQ | 3 | init | 0 |
| B Send queues: | | | | |
| Wait Send Queue | WsQ | 2 | error, init | 0 |

TABLE III-continued

| Queue name | Cell name | Queue depth | Reset condition | Reset value |
|---|---|---|---|---|
| Locked Queue | LcQ | 2 | error, init | 0 |

*Resets on error only during a detach.

Referring to FIG. 7, the queues are sequenced through states as follows.

FoQ state block (100). The FoQ holds the free slots waiting for an outgoing send request packet. This queue must have a free slot before accepting an outgoing request. SdRdy and OtRqPnd (on bus 254) are computed from this queue's depth. The EXTCTL block (204) pushes this queue when all cycles of an incoming reply have been transferred to the internal logic (4). The BICTL block (202) pops this queue when there is an outgoing request starting to be sent out by the internal logic. When the send packet arrives, the state changes to the next state.

TpQ state block (102). A request goes from FoQ state block (100) to either TpQ state block (102) or PrQ state block (114) depending upon whether the request is for this BXU or this BXU's partner. TpQ holds a request waiting for the arbitration logic (106). These requests are either waiting to arbitrate or are currently arbitrating. The ARBCTL block (206) uses the presence of a slot in this queue to initiate arbitration. Requests in this queue will be retried on an error. The BICTL block (202) pushes this queue when an outgoing request is starting to be sent from the internal logic or when a locked request is being reissued. (The new request has priority.) The ARBCTL block (206) pops this queue when the request is given a grant. When the grant is obtained from the arbitration logic, the state changes.

GnQ state block (104). The GnQ holds the order of the grants given by the ARBCTL logic (206). The depth of this queue is monitored by all agents on the AP bus. This queue counts all grants issued on the bus, but individual position in the queue is kept only for grants that belong to this component.

The EXTCTL block (204) uses this queue's state to determine if the first grant belongs to this component. If it does, then this is the next request to be sent on the AP bus. Requests in this queue will be retried on an error. The ARBCTL block (206) pushes this queue when the request is given a grant. The EXTCTL block (204) pops this queue when the request is started on the AP bus. When sent, the state changes.

PiQ state block (106). PiQ holds the requests that are outstanding on the AP bus waiting for reply. The depth of this queue is monitored by all components attached to the AP bus. This queue holds all outstanding requests issued on the AP bus, but each component just keeps its individual position in the queue and the queue depth. The EXTCTL block (204) uses this queue's status to determine if the reply on the bus is for this component. The EXTCTL block (204) pushes this queue when a request is started on the AP bus. The EXTCTL block (204) pops this queue when a reply is seen on the bus. When a reply is received, the state changes.

RsQ state block (108). RsQ holds the reply from the bus waiting to get transferred to the internal logic (4). The BICTL block (202) looks at the top of this queue to determine whether there is a reply to be sent to the internal logic. The EXTCTL block (204) pushes this queue when an incoming reply is seen on the bus, provided that the reply type is not a reissue. The BICTL block (202) pops this queue when the transfer to the internal logic has been accepted. The popped slot enters the free queue to wait for a new request. There is a Related "B" Queue, the wait send queue (WsQ). The WsQ also holds the incoming replies, but just long enough for the data to be found to be error free. When the reply has been transferred to internal logic, the state changes to FoQ state block (100).

PrQ state block (114). A request goes from FoQ state block (100) to either TpQ state block (102) or PrQ state block (114) depending upon whether the request is for this BXU or this BXU's partner. The Partner queue holds outstanding write requests for this BXU's partner. The queues output MUX uses the PrQ status to determine if it needs to retry any requests for its partner on a detach. The BICTL block (202) pushes this queue when a partner's request is transferred on the BiData bus.

The Partner queue is popped by receiving a PopQue from the partner BXU. The partner signals PopQue in response to an internal PopRsQ, which means the reply has been transferred to the internal logic.

HpQ state block (116). The Hold partner queue holds requests that were trapped in a detaching partner. The function of the HpQ is described further below under "partnering flows". Hold partner queue is necessary to perform retry correctly in the partner detaching case. A reply that has returned and has been cleared for errors must not be retried, but if the reply has returned out of order, it cannot be transferred to the internal logic or put back into free queue. Hold partner queue is a holding place for these trapped requests. HpQ is pushed when PopQue is signaled during the partner communication window. This will only occur in a BXU whose partner is detaching. A pop is generated when the request becomes untrapped due to retry of a previous request completing.

B Queues

WsQ state block (110). The wait send queue holds the replies coming from the bus waiting for the transfer to be found to be error free. The retry mechanism retries slots in this queue. The EXTCTL block (204) pushes this queue when an incoming reply is seen on the bus provided that the reply type is not a reissue. The EXTCTL block (204) pops this queue when the transfer on the AP bus is found to be correct. There is a related A Queue, the RsQ (ReSponse Queue) which also holds the incoming replies, but keeps the reply until it is accepted by the internal logic.

LcQ state block (112). The Lock queue holds the requests waiting to get reissued after receiving a reissue reply. The logic will automatically reissue these requests when the send interface is free. Slots in this queue will be retried on an error. The EXTCTL block (204) pushes this queue when an incoming reply is seen on the bus and the reply type is a reissue. The BICTL block (202) pops this queue when the sending interface is free and the request can start the reissue process.

Refer now to FIG. 8 which is a state diagram for receiving a request on the AP bus. Each state is correlated with a corresponding queue, defined in Table IV.

TABLE IV

| Queue name | Cell name | Queue depth | Reset condition | reset value |
|---|---|---|---|---|
| A Receive queues: | | | | |
| Request Queue | RqQ | 4 | init, error | 0 |

TABLE IV-continued

| Queue name | Cell name | Queue depth | Reset condition | reset value |
|---|---|---|---|---|
| Pending Queue | PnQ | 4 | init, error | 0 |
| Reply Queue | RpQ | 4 | init, error | 0 |
| B Receive queues: | | | | |
| Free Request Queue | FRQ | 4 | init, error | 3 |
| Incoming Request Queue | IRQ | 4 | init, error | 0 |
| Hold Reply Queue | HRQ | 4 | init, error | 0 |

FRQ state block (120). FrQ holds the free slots waiting for an incoming request. The EXTCTL block (204) checks this queue for a free slot before accepting an incoming request. The EXTCTL block (204) pushes this queue when all cycles of an outgoing reply have been found to be error free. The EXTCTL block (204) pops this queue when the first cycle of an incoming request has been received on the AP bus. When the incoming request receive packet arrives, the state changes to the next state.

IrQ state block (122). The incoming request queue holds requests outstanding on the AP bus. The depth of this queue is equal to that of the PiQ (106) of FIG. 7 and is monitored by all components attached to the AP bus. This queue holds all outstanding requests issued on the AP bus, but each component just keeps its individual position in the queue and the queue depth. The EXTCTL block (204) uses the status of this queue to determine when this part should send out a reply or whether RPYDEF (replay deferral) should be asserted. The EXTCTL block (204) pushes this queue when the request has started being received on the AP bus. The EXTCTL block (204) pops this queue when the last cycle of the corresponding reply is found to be error free on the AP bus. There are related "A" Queues, the RqQ (124), the PnQ (126), and the RpQ (128).

RqQ state block (124). RqQ queue holds incoming requests waiting to be transferred to the internal logic (4). The BICTL block (202) looks to see if at the top of this queue there is a request for this BXU. If there is, then this is the next request to be sent on the internal interface. The EXTCTL block (204) pushes this queue when the first cycle of an incoming request is received from the AP bus. This queue is not pushed if the incoming request does not "match" this component's address range (both physical addresses or IAC-interagent communication-addresses are checked). All other IAC's are handled as normal requests by the BCL. The BICTL block (202) pops this queue when the first cycle of the request is sent on the internal interface. IrQ is the related "B" queue. Once the request is accepted by the internal logic (4), the state changes.

PnQ state block (126). PnQ holds the requests that have been accepted by the internal logic (4), but have not yet received replies from the internal logic (4). The BICTL block (202) uses the status of this queue to determine which packet buffer in the RAM (212) the reply should be stored in. The BICTL block pushes this queue when the first cycles of the request are sent on the internal interface. The EXTCTL block (204) pops this queue when the first cycle of the reply is sent on the AP bus. Once a reply is received from the internal logic (4), the state changes.

RpQ state block (128). RpQ holds the replies that come from the internal logic (4) and waiting for an AP bus slot. Once the reply has been sent on the AP bus, the state changes to the FrQ state (120).

The simple case of sending and receiving a request is accomplished by tracking the state of a single transaction as just described above. The state diagrams of FIGS. 7 and 8 illustrate additional states, complicated by several factors:

1. Up to six transactions may be taking place at once.
2. Providing for reply deferral adds the requirement of being able to reorder the queues.
3. Additional state information is needed for fault tolerance.
4. In error cases, requests need previous state information for retry.
5. Partnered bus control units (BXUs) need to track each other's requests.

The first difficulty is handled by making each state in the diagrams of FIGS. 7 and 8 a first-in first-out (FIFO) queue and allowing many transactions to circulate at the same time. The second problem of reply deferral is handled as follows. States that are reorderable are provided with a recirculate path that allows a request to be popped off the bottom of the queue and pushed onto the top of the queue in the same cycle. The third complication of having to carry additional state information for fault tolerance is handled by having extra states in the state diagram. The fourth complication, retry, is handled by adding extra state transitions to allow requests to go back to a previous state if an error occurs. Partnering, the last complication, is taken care of by adding queues to track a partner's state.

Outgoing Request Flows

Initially, three free slots are in a free outgoing queue (100) waiting for an outgoing request. When a request is given to the bus control logic (BCL), the first send slot in the free outgoing queue (100) is assigned to the request and the send slot drops into the temporary queue (102). In the temporary queue, the slot waits for the next AP bus arbitration sequence and at the correct time is arbitrated. When a grant is given, the request slot drops into the grant queue (104) where it waits for its turn on the AP bus. The double lines of the grant queue block (104) signify that this queue has depth across the bus. When the request is driven onto the bus, the slot drops into the pipe queue (106) where it waits for a reply. The double lines of the pipe queue block (106) signify that this queue has depth across the bus. When the reply is seen on the bus, the slot drops into the response queue (108). The reply waits in the response queue until the reply can be transferred to the internal logic. After the reply has been accepted by the internal logic, the slot becomes free again and returns to the free queue (100).

In parallel with dropping into the response queue (108), the send slot also enters the wait send queue (110). The double lines of the wait send queue block (110) signify that this queue has depth across the bus. The send slot will wait in the wait send queue until this transaction has been determined to be error free. If *enable wait for berl* is set, the send slot will leave the wait send queue (110) two cycles later; otherwise, the slot will leave the wait send queue on the next cycle.

Reissue Reply

If the reply is a reissue reply, the slot will drop out of wait send queue (110) into the locked queue (112). The slot will wait in the locked queue until no new request is being accepted from the Bibus. The slot will then go back to the temporary queue (102) where it will be rearbitrated and sent onto the AP bus.

Reply Deferral

When a request is the first request in the pipe queue (106) and a reply deferral occurs, the request is popped out of the pipe queue and pushed (107) onto the top of the pipe queue again. When the request becomes the first request in the pipe queue (106) again and the reply returns, then the request drops into the response queue (108). If deferral has caused replies to return out of order, all replies that returned out of order will be waiting in the response queue (108) to be reordered. Requests will be popped out of the bottom and pushed onto the top of the response queue (108) until the first request is on the bottom. The reply to this first request can then be returned to the internal logic and the send slot will return to the free queue (100).

Error Flows

When an error occurs, all send slots that are in an outstanding request state need to be retried. This is done by checking each slot's state to see if a slot is in the temporary queue (102), grant queue (104), pipe queue (107), wait send queue (110), locked queue (112), or partner queue (114). If a slot is in one of these outstanding request queues, it is returned to the temporary queue (102) where it can start the arbitration sequence again. Requests in the response queue (108), but not in the wait send queue (110), have completed. Due to reply deferral, the reply is out of order and cannot be returned to the internal logic. These slots remain in the response queue (108) through the error windows and, during retry, the previous request will complete and then the reply can be transferred to the internal logic. The slot then becomes free and is returned to the free outgoing queue (100).

Partnering

When a request is recognized by the BXU (10) as a partner request, that is, a request being handled by the partner BXU (12), it is placed in the partner queue (114). It waits there as the partner's request arbitrates, the partner BXU sends the request on the AP bus (20), the partner's reply returns, and the partner's reply is accepted by the internal logic of the partner BXU (12). When the partner BXU (12) completes the transfer of the reply, it asserts the PopQue line which is included in the local bus (18) to thereby signal the BXU (10) to pop the request out of partner queue of the BXU (10). The request is popped out of the partner queue (114) into the HpQ state block (116). If the partner requests are in order, they will immediately flow back onto the free queue, FoQ state block (100). If the reply has returned out of order, it cannot be transferred to the internal logic or put back into free queue (FoQ). Hold partner queue is a holding place for these trapped requests.

Since all requests are tracked by both BXUs (10, 12), order is maintained with respect to all requests by means of the single local bus (18). Although reply deferral is disabled in partnered cases, replies may come back out of order since they will have been sent out on separate AP buses (20 or 22) corresponding to the BXU (12 or 10) with which the request is associated. One AP bus may have lighter traffic or faster memory response and therefore a request to this bus may complete earlier than a previous request to the other bus.

Since request order is maintained by both of the BXUs, an out-of-order reply at the BXU (10) will wait in the response queue (108) until the previous request on the partner BXU (12) completes and is signaled complete to the BXU (10) by means of the PopQue line (226). Then reply will be returned to the internal logic (8) and the PopQue line signaled to the partner. If an error should occur before the previous request has completed, this request could be trapped. That is, the request has completed, but it is trapped behind a previous request that has not completed. In normal error cases, trapping is not a problem because each BXU will retry its own requests. The trapped request will not be retried, but will wait in the response queue (108) during retry until the previous request retry completes. When the partner BXU (12) asserts the PopQue line, the trapped request on the BXU (10) is freed and can be transferred to the internal logic (4). Trapping becomes a problem in the case where a BXU is being detached. When a BXU is being detached, it looks at its queues to determine if it has any requests that have completed, but are trapped. If there are trapped requests, it must signal to its partner so these requests will not be retried. This signaling is done over the PopQue. When the remaining BXU sees this signaling, it pops this partner request out of the partner queue (114) into the hold partner queue (116). Requests in the hold partner queue are not retried. The slot waits in the hold partner queue until the previous request that trapped it is retried and completes. The order is now regained and the slot is sent back into free queue (100).

Referring now to FIG. 8, the incoming request flows will now be described.

Initially, three free receive slots are in a free receive queue (120) waiting for an incoming request. A free incoming request receive slot waits in the free receive queue (120) until a request for this BXU is recognized on the AP bus. This receive slot then drops into the incoming request queue (122) and the request queue (124) in parallel. The double lines of the incoming request queue (122) signify that this queue has depth across the bus. The incoming request queue (122) maintains the same information as the pipe queue (106) of FIG. 7. This pipe queue (106) state must be maintained on the receive side so that the receiving BXU knows when it is its turn to reply. When a request is the first request in the incoming request queue (122) and a reply deferral occurs, the request is popped out of the incoming request queue (122) and pushed (123) onto the top of the incoming request queue again. When the request becomes the first request in the incoming request queue (122) again and the reply returns, then the request returns to the free queue (120).

The request queue (124) maintains the state of a request that has been accepted and is waiting in the BCL. When the request has been transferred to the internal logic, the receive slot drops into the pending queue (126) where it waits for a reply. When the reply is returned to the BCL, the slot drops into the reply queue (128) which tells the BCL that it should stop deferring the reply and send the reply onto the AP bus at the correct time. When the reply is issued onto the AP bus, the slot drops out of the incoming request queue (122) and returns to the free queue (120).

There are a few cases that complicate this receive queue model. Reply deferral causes the incoming request queue (122) to reorder in the same way the pipe queue (106) of FIG. 7 is reordered. If *pass through* (125) is enabled, the incoming request will pass through from the AP bus directly to the internal logic and the request queue (124) will be bypassed.

Errors are handled very simply in the receive queue. Since all outstanding requests will be reissued, the receive queues reset on an error.

While the invention has been particularly shown and described with reference to a preferred embodiment thereof, it will be understood by those skilled in the art that various changes in form and detail may be made therein without departing from the scope of the invention.

We claim:

1. Apparatus for queuing bus requests and bus replies on a pipelined packet bus comprising:
   a RAM (212) for buffering bus requests by storing packet information corresponding to each said bus request to be sent over said bus in bus time slots allotted to each said bus request;
   each said bus request being comprised one of either a send request or a receive request;
   a number (n) of send slots (208) for keeping track of the state of n send requests that are stored in said RAM (212);
   a number (m) of receive slots (210) for keeping track of the state of m receive requests that are stored in said RAM (212);
   a plurality of send queue counters (230) comprising a first state logic for providing a series of first states corresponding to a series of send queues for tracking a said request and for tracking a corresponding send reply;
   a plurality of receive queue counters (232) comprising a second state logic for providing a series of second states corresponding to a series of receive queues for tracking a receive request and for tracking a corresponding receive reply;
   an output MUX (214) connected to said send and receive slots for generating status information as to the state of said slots; and,
   means (203, 204, 206) connected to said output MUX (214), responsive to said status information as to the state of said slots, for incrementing or decrementing said send queue counters (230) and said receive queue counters (232) in accordance with a predetermined system bus protocol.

2. The combination in accordance with claim 1 wherein
   said output MUX (214) includes means for generating place lines that provide information as to which queue locations are occupied by said bus requests.

3. The combination in accordance with claim 1 wherein
   said output MUX (214) includes means for reordering replies by reordering said slots, and means for generating RAM word selects (220) by determining which slots are available for writing into from the RAM (212).

4. The combination in accordance with claim 1 wherein
   said output MUX (214) includes means for generating RAM word selects (313) by determining which slots are available for filling from said bus.

5. The combination in accordance with claim 1 wherein
   each of said send slots and said receive slots includes a multi-bit shift register depth counter, a maximum count of which is equal to a maximum queue depth, said combination further comprising:
   means for resetting each of said depth counters to a unique value.

6. The combination in accordance with claim 5 wherein
   each of said send slots and said receive slots includes a slot state counter for tracking the state of said slot in said send and receive queues;
   said depth counters and said state counters being reset to values which initialize said send slots to first, second, and third order in said send queue and said receive slots to first, second, and third order in said receive queue.

7. The combination in accordance with claim 5 wherein
   said depth counters and said state counters are reset to values which place said receive slots first, second, and third order in said receive queue upon the occurrence of an error.

8. The method of queuing bus requests and bus replies on a pipelined packet bus, each said bus request being comprised one of either a send request or a receive request, comprising the steps of:
   A. buffering said bus requests by storing packet information corresponding to each said bus request to be sent over said bus in bus time slots allotted to each said bus request;
   B. keeping track, in (n) send slots (208), of the state of n send requests that are stored in a RAM (212);
   C. keeping track, in (m) receive slots (210), of the state of m receive requests that are stored in said RAM (212);
   D. providing a first state logic comprising a series of first states corresponding to a series of send queues for tracking a send request and for tracking a corresponding send reply;
   E. providing a second state logic comprising a series of second states corresponding to a series of receive queues for tracking receive request and for tracking a corresponding receive reply;
   F. generating status information as to the state of said slots; and,
   G. incrementing or decrementing said first state logic (230) and said second state logic (232) in response to said status information as to the state of said slots, in accordance with a predetermined system bus protocol.

9. The method in accordance with claim 8 including the step of:
   H. generating place lines that provide information as to which queue locations are occupied by bus requests.

10. The method in accordance with claim 8 including the step of:
    H. reordering replies by reordering said slots, and,
    I. generating RAM word selects (220) by determining which slots are available for writing into from said RAM (212).

11. The method in accordance with claim 8 further comprising the step of:
    H. generating RAM word selects (313) by determining which slots are available for filling from said bus.

12. The method in accordance with claim 8 further comprising the steps of:
    H. providing each of said send slots and said receive slots with a multi-bit shift register depth counter, a maximum count of which is equal to a maximum queue depth; and,
    I. resetting each of said depth counters to a unique value.

13. The method in accordance with claim 12 including the steps of:
   J. providing each of said send slots and said receive slots with a slot state counter for tracking the state of said slot in said send and receive queues; and,
   K. resetting said depth counters and said state counters to values which initialize said send slots to first, second, and third order in said send queue and said receive slots to first, second, and third order in said receive queue.

14. The method in accordance with claim 12 including the step of:
   J. resetting said depth counters and said state counters to values which place said receive slots first, second, or third in said free receive queue upon the occurrence of an error.

* * * * *